United States Patent [19]
Inoue et al.

[11] 3,866,952
[45] Feb. 18, 1975

[54] JOINT STRUCTURE FOR STEEL PIPE PILES

[75] Inventors: Jiro Inoue, Kamakura; Ken Takatori, Kawasaki; Tsuyoshi Nakamata, Hiratsuka, all of Japan

[73] Assignee: Nippon Kokan Kabushiki Kaisha, Tokyo, Japan

[22] Filed: May 16, 1973

[21] Appl. No.: 360,929

[30] Foreign Application Priority Data
Dec. 9, 1972  Japan............................ 47-141578

[52] U.S. Cl. .............................................. 285/21
[51] Int. Cl. ............................................ F16l 13/02
[58] Field of Search ......................... 285/21, 22, 286

[56] References Cited
UNITED STATES PATENTS

| | | | |
|---|---|---|---|
| 100,394 | 3/1870 | Gwyn | 285/21 |
| 1,962,350 | 6/1934 | Kane | 285/22 |
| 2,878,040 | 3/1959 | Hobbs | 285/286 |
| 2,967,352 | 1/1961 | Weil | 285/286 |

*Primary Examiner*—Patrick D. Lawson
*Attorney, Agent, or Firm*—Flynn & Frishauf

[57] ABSTRACT

The invention relates to an improved joint structure used for jointing steel pipe pile pieces. The lower pile piece is provided with a stopper member which is secured on the inner wall of the pile at a position slightly lower than the joint and edge portion thereof and whose upper surface has an angle of inclination under 90°. The upper pile piece is provided with a joint metal piece which is secured on the inner wall of the pile piece has a straight portion and a reduced diameter portion and whose edge is cut to an angle so that in the normal engaging positions the edge comes into close contact with the inclined surface of the associated stopper member, thus preventing the phenomena of sideslipping between the upper and lower pile pieces. The band is fit on either the upper or lower pile pieces (preferably on the upper pile piece), serving as a guide for the welding device that travel along the outer periphery of the pile.

6 Claims, 7 Drawing Figures

PATENTED FEB 18 1975  3,866,952

JOINT STRUCTURE FOR STEEL PIPE PILES

BACKGROUND OF THE INVENTION

In recent years, in the field welding of steel pipe piles the process of manual welding has been increasingly superseded by the automatic welding. There is not much occasion to carefully adjust the positioning of the abutting pipe ends at the joint. Thus, there has existed a need to insure that the pipe ends can always be properly coupled together at the joint under the same conditions with proper positioning and alignment.

Generally, there are tolerances for steel pipe piles with respect to the pipe diameters. As the diameter of the steel pipe pile increases, there is more tendency for an offcenter or deviation (a) (FIG. 1) to occur. Thus, it has been considered essential that such an offcenter or deviation must be minimized to ensure a satisfactory strength. Moreover, since the pipe joint is a so-called one-side joint, it has also been considered an important factor that the root gap or opening (b) (FIG. 1) be properly adjusted to ensure the desired mechanical strength at the welded area.

Heretofore it always has been difficult to meet the requirements stated above. All of the customary joint structures utilizing various kinds of backing strip and specially developed to overcome these difficulties have been found unsatisfactory. When the upper pile piece is set up on the lower pile piece, as shown in FIG. 2, the upper pipe piece 1 is raised and moved by a crane, for example. Consequently, the upper pile piece 1 is raised in the inclined position with the result that the upper pile piece 1 is inevitably fit with an inclination into the lower pile piece 2 at the joint therewith. In this case, though an annular backing metal 3 is used at the joint end of the upper pile piece 1, when being positioned on the lower pile piece, the unstable balance of the upper pile piece results in an increased tendency of the upper pile piece 1 to shift sideways toward the axis of the pipe, thus considerably deteriorating the efficiency of erection and positioning operation of the upper pile piece. This problem has been the most serious drawback of the customary joint structures.

SUMMARY OF THE INVENTION

It is therefore the principal object of the present invention to provide an improved joint structure for steel pipe piles which eliminates the above-mentioned drawbacks of the conventional joints for welding steel pipe piles and which is so constructed that the phenomena of sideslipping, which has heretofore been one of the most troublesome aspect of erecting and positioning an upper pipe piece on a lower pile piece, can be positively prevented.

A unique feature of the improved joint structure according to the present invention resides, to attain the above-mentioned object, in the use of tubular joint metal pieces secured to the inner side of the lower pile piece, the provision of various stopper members which cooperate with the joint metal pieces. A further optional feature is the provision of a band mounted on the upper or lower pile piece near the joint, whereby any variation caused in the roundness of the pile piece upon the driving thereof also occurs in the band and thus the band serves as a travelling guide for the welding device which performs the welding in accordance with the "variation" in the roundness of the pipe piece.

The above and other objects and features of the present invention will be readily apparent from the following detailed description when taken in conjunction with the accompanying drawings.

DESCRIPTION OF THE PREFERRED EMBODIMENTS

Figure 3:
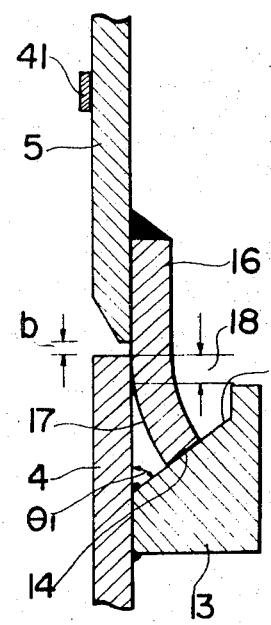
FIGS. 3 through 5 are fractional sectional views showing respectively the manner in which upper and lower pile pieces are joined together with various joint metals and the stopper members of the present invention.
Figure 4:
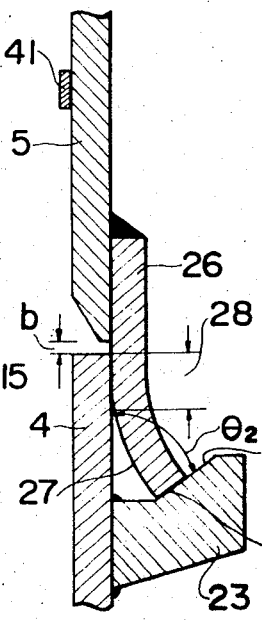
Figure 5:
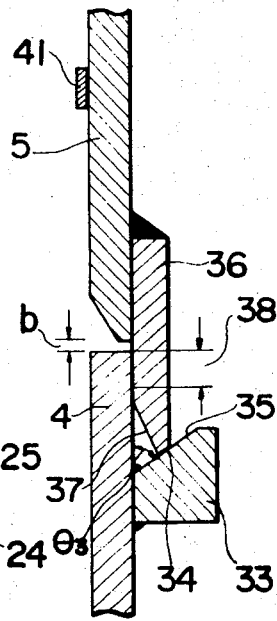

Referring now to FIGS. 3 to 5, each of the joint metal pieces 16, 26, and 36 secured to the inner wall of the upper pile piece 5 consists of a tubular member having a diameter that is adapted to be fit tightly into the inner diameter portion of the lower pile piece 4 at the joint end thereof. The diameter of the forward end of the respective joint metal pieces that is fit into the lower pile piece, is slightly reduced and therefore the forward end is inwardly curved in cross section. Consequently, these joint metal pieces are divided respectively into straight portions 18, 28 and 38 constituting the major portions and reduced diameter portions 17, 27 and 37 formed at the forward ends of the joint metal pieces. Edges 14, 24 and 34 of the reduced diameter portions 17, 27 and 37 are respectively cut to an angle so that in the normal engaging positions the edges 14, 24 and 34 come into close contact with the inclined surfaces of the associated stopper members that will be explained later.

On the other hand, stoppers 13, 23 and 33 respectively welded and secured to the lower pile piece 4 each consists of a block member protuberantly secured to the inner wall of the lower pile piece 4 at a position slightly below the joint end thereof. The position of the respective stoppers is predetermined so that when the upper pile piece 5 is joined with the lower pile piece 4, the stopper receives the forward end of the joint metal piece with the regular root gap b being maintained between the upper and lower pile pieces. In the respective stoppers 13, 23 and 33 the upper surfaces that receive the forward ends of the joint metal pieces are formed into inclined surfaces 15, 25 and 35 having respectively and angle $\theta$ of inclination within a predetermined range, i.e., $\theta_1$, $\theta_2$ and $\theta_3$ with respect to the inner wall of the lower pipe piece 4. The angle $\theta$ of inclination must be an acute angle under 90° and it should preferably be an angle of about 45°, although the similar effect can be obtained with other angles. Since the stoppers 13, 23 and 33 are adapted to positively receive respectively the joint metal piece of the upper pile piece at their predetermined positions so as to joint and maintain the upper and lower pile pieces in a desired position, there is no question that the stoppers 13, 23 and 33 may be continuously formed on the entire inner periphery of the lower pile piece to engage practically the entire forward ends of the joint metal pieces 16, 26 and 36. However, each of the stoppers may consist of separate segments arranged at any given intervals forming an annular shape and thus partially receiving the forward ends of the reduced diameter portions of the joint metal pieces.

Figure 6:
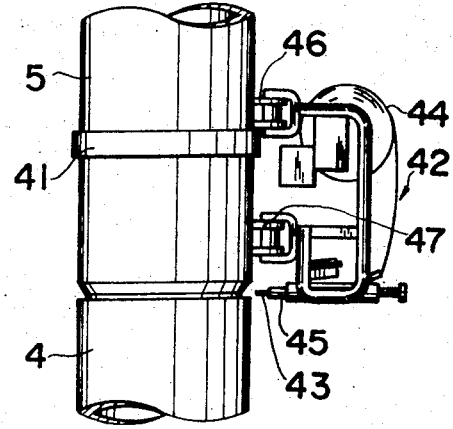
FIG. 6 is a front view showing the manner in which the joined upper and lower pile pieces are welded together according to the present invention.
Figure 7:
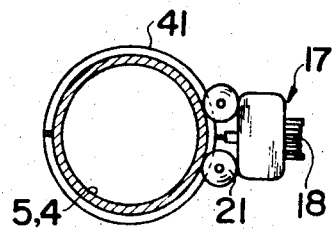
FIG. 7 is a plan view of FIG. 6.

In the figures, numeral 41 designates a band which serves as a guide for the welding device that travels along the outer periphery of the pile as will be explained later. The band 41 is fit on either the upper or lower pile piece (preferably on the upper pile piece) at a position near the joint of the upper and lower pile pieces, that is, the band 41 is preliminarily fit at a place where any variation in the roundness of the pile directly appears. In FIGS. 6 and 7, numeral 42 designates an automatic welding device in which a wire 43 is fed from a wire reel 44 and a torch 45 that has been preliminarily positioned at the joint groove by the band 41 welds the upper and lower pile pieces at the joint. During the welding operation, the automatic welding device 42 travels along the outer periphery of the pile by means of magnet rollers 46 and 47 mounted on the pile in the vertical positions. The welding device 42 is moved with the band 41 as its guide and therefore even if there is any variation in the roundness of the pile, this variation is directly reflected in the shape of the band 41, so that the welding device 42 is moved along the outer periphery of the pile in accordance with the variation in the roundness of the pile. During the movement of the welding device, the position of the torch 45 is always maintained at the proper position with respect to the joint groove.

Figure 1:
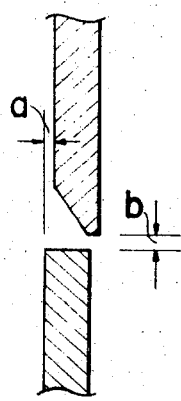
FIG. 1 is an enlarged sectional view showing a part of the joint between upper and lower pile pieces.
Figure 2:
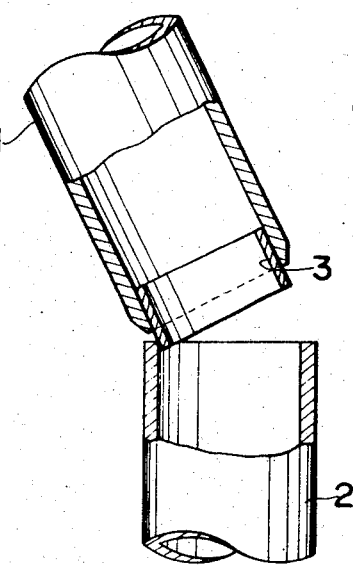
FIG. 2 is a fractional front view showing the manner in which an upper pile piece is being fit into a lower pile piece for driving according to a conventional method.

The function of the joint structure according to the present invention will now be explained. The upper pile piece 5 is first raised slantingly by a lifting machine (not shown) and it is then positioned on the lower pile piece 4 so that the joint end of the upper pile piece 5 is slantingly placed on the upper end of the lower pile piece 4 as shown in FIG. 2.

In the slanting position of the upper pile piece, only the edge portion of a part of the joint metal piece abuts the associated one of the inclined surfaces 15, 25 and 35 of the stoppers 13, 23 and 33. However, since this abutting portion is received by the inclined surface of the stopper, even during the time that the center of gravity of the upper pile piece is still shifting gradually, the abutting portion of the joint metal piece does not sideslip toward the center of the pipe over the stopper and in fact the upper pile piece is gradually brought into a vertical position with the abutting portion acting as the fulcrum. As the upper pile piece comes near its vertical position, the whole periphery of the forward reduced diameter portion of the joint metal piece is smoothly and gradually received into the bore of the lower pile piece and eventually the upper pile piece is brought into the vertical position, thus completing the joint. When the joint is completed, a portion of the straight portion of the joint metal piece is completely fit in the lower pile piece and thus no offcenter or out of alignment occurs. Moreover, since the length of joint metal piece and the position of stopper are predetermined, the desired root gap can be positively provided.

In the joint structure according to the present invention, any modified form of the stopper, such as, one having a projection at the end of the inclined surface (FIG. 3) or another in which the inclined surface of the stopper is limited to a minimum necessary for receiving the abutting portion of the joint metal piece (FIG. 4), may be utilized so far as the intended purpose and the function can be obtained. Furthermore, instead of the reduced curved forward end portion of the joint metal piece, one tapered as shown in FIG. 5 may be used to chieve the same result as obtained with the one used in the embodiment according to the basic idea of this invention.

It will thus be seen from the foregoing description that the joint structure for steel pipe piles according to the present invention has a great advantage in that with no extreme structural modifications as compared with the conventional joint structures, the safety and working efficiency in the erection and positioning operation can be improved considerably. At the same time the most requisite conditions for the satisfactory joint structure for steel pipe piles can be positively ensured. Moreover, it is self-evident that the use of the joint structure according to the present invention is not limited to the joint for steel pipe piles and it is extensively usable for the construction of steel chimney, steel silo and so on and as the joint structure for the field welding of steel pipe columns.

What is claimed is:

1. A joint structure for jointing upper and lower steel pipe pile pieces, comprising:
    a stopper member secured to the inner periphery of said lower pipe pile piece below the joint end edge of said lower pipe pile piece, the upper surface of said stopper member having an angle of inclination of under 90° relative to the inner periphery of said lower pipe pile piece; and
    a generally tubular joint metal piece secured to said upper pipe pile piece and projecting therefrom so as to be received within said lower pipe pile piece, the end of said joint metal piece remote from the end of said upper pipe pile piece being of reduced diameter relative to the remainder of said joint metal piece, the end face of said reduced diameter portion of said joint metal piece being formed with an inclined surface having an angle of inclination corresponding to said angle of inclination of said upper surface of said stopper member, so that said end face of said joint metal piece comes into close contact with said upper inclined surface of said stopper member when said upper and lower pipe pile pieces are joined.

2. A joint structure for steel pipe piles according to claim 1 wherein said joint metal piece is secured to the inner wall of said upper pipe pile piece.

3. A joint structure for steel pipe piles according to claim 2, comprising a welding device guide band attached around the outer periphery of at least one of said upper and lower pipe pile pieces having said joint metal piece secured to the inner wall thereof, so as to project therefrom, said band being located at a position near the joint of said upper and lower pipe pile pieces and where any variation in the roundness of the pile is directly reflected.

4. A joint structure for steel pipe piles according to claim 3 wherein said band is attached to said upper pipe pile piece.

5. A joint structure for steel pipe piles according to claim 1 wherein said angles of inclination of said upper surface of said stop member and the end face of said joint metal piece are the same.

6. A joint structure for steel pipe piles according to claim 1 wherein said upper surface of said stopper member extends toward the joint end edge of said lower pipe pile piece.

* * * * *